(12) United States Patent
Nania (10) Patent No.: US 8,272,677 B2
(45) Date of Patent: Sep. 25, 2012

(54) TENSIONING BOW FOR A CONVERTIBLE TOP

(75) Inventor: Adrian Nania, Rochester, MI (US)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 231 days.

(21) Appl. No.: 12/619,388

(22) Filed: Nov. 16, 2009

(65) Prior Publication Data

US 2011/0115249 A1    May 19, 2011

(51) Int. Cl.
*B60J 7/12* (2006.01)
(52) U.S. Cl. ............ 296/118; 296/107.12; 296/122
(58) Field of Classification Search .......... 296/107.01, 296/107.09, 107.12, 109, 118, 121, 122
See application file for complete search history.

(56) References Cited

U.S. PATENT DOCUMENTS

| 6,971,705 B2 | 12/2005 | Nania |
| 7,992,919 B2 * | 8/2011 | Huotari et al. ............... 296/122 |
| 2007/0063533 A1 * | 3/2007 | Zehnder et al. ............... 296/118 |

FOREIGN PATENT DOCUMENTS

| DE | 100 39 220 A1 | 2/2002 |
| DE | 103 42 128 A1 | 6/2004 |
| DE | 10 2006 036 658 B3 | 1/2008 |

* cited by examiner

*Primary Examiner* — Glenn Dayoan
*Assistant Examiner* — Jason S Daniels
(74) *Attorney, Agent, or Firm* — Davidson, Davidson & Kappel, LLC (57) ABSTRACT

The invention relates to a tensioning bow for a convertible top, a convertible top for a convertible vehicle, a convertible vehicle and a method for mounting a convertible top to a body of a convertible vehicle. The tensioning bow comprises a main segment having a first end and a second end, a first pivotable segment being assigned to the first end of the main segment, and a second segment, wherein a first rotary joint pivotably connects the first pivotable segment to a portion of the main segment, and wherein a second rotary joint pivotably connects the first pivotable segment to the second segment.

20 Claims, 10 Drawing Sheets

Fig. 9

TENSIONING BOW FOR A CONVERTIBLE TOP

FIELD OF THE INVENTION

The invention relates to a tensioning bow for a convertible top, a convertible top for a convertible vehicle, a convertible vehicle and a method for mounting a convertible top to a body of a convertible vehicle.

BACKGROUND

Soft tops for convertible vehicles are known from practical experience in which an outer convertible top fabric may be stretched by a plurality of linkage parts over the interior of the vehicle, the soft top being displaceable between a closed position and an open position. In the open position, the soft top is stowed in a portion of the vehicle bodywork provided therefor in the rear of the convertible vehicle. In order to ensure a sufficient tension of the convertible top fabric in the closed position of the convertible top, it is known to provide a tensioning bow which is fixed to a rear portion of the convertible top fabric and tensions the convertible top fabric in the direction of the rear of the vehicle. Generally, the tensioning bow is connected at its ends to main bearing units of the convertible top arranged respectively to the side or connected to further linkage elements of the convertible top and is forcibly guided in its motion by a mechanical coupling to parts of the convertible top linkage.

During production of convertible vehicles it is usual nowadays to provide the convertible top, i.e. the linkage, the convertible top fabric, possibly a rear window fixed in the convertible top fabric as well as drive elements for a driven positive control device of the convertible top, as a prefabricated sub-assembly, for installation in the motor vehicle body at the point of assembly. In this connection it is a drawback that the opening provided in the vehicle body for receiving the convertible top is generally dimensioned to be quite a tight fit so that, in particular, the tensioning bow may not be inserted into the opening without difficulty. Hitherto, it was necessary to release the tensioning bow from further elements of the convertible top, to insert it separately into the vehicle body, to fasten it there and subsequently to connect it again to the remaining convertible top parts. This method is complicated, time-consuming and results in high costs.

DE 100 39 220 A1 discloses a soft top for a convertible vehicle comprising a convertible top linkage, which has a plurality of hoops arranged transversely in the direction of travel. In particular, the hoops arranged to the front in the direction of travel are of multi-part configuration and comprise a main segment substantially spanning the vehicle transverse axis, as well as at the ends of the main segment one respective pivotable segment. The pivotable segments are connected by means of turn-and-slide joints to the main segment. In order to move the convertible top from a closed position, in which the convertible top fabric is tensioned by the convertible top linkage, into the stowed position, initially the pivotable segments are displaced in a linear manner in the direction of the main segment, whereby the tensioning of the convertible top fabric is released. Subsequently, the pivotable segments are pivoted onto the main segment in order to reduce the stowage space for the convertible top. It is a drawback that it is not possible for the convertible top to be inserted in a simple manner into an opening of the vehicle body provided for the convertible top, during an assembly process of the convertible vehicle.

DE 10 2006 036 658 B3 discloses a tensioning bow for a convertible top which consists of two segments which are connected by means of a resilient portion attached in the middle of the tensioning bow. By means of the resilient portion, it becomes possible to deform the tensioning bow resiliently when assembled in a motor vehicle body, whereby the tensioning bow may be inserted more easily into a vehicle body opening which is smaller relative to the dimensions of the tensioning bow. It is a drawback that for the deformation process the tensioning bow has to be released from the remaining linkage parts of the convertible top, which leads to a complicated and time-consuming assembly of the tensioning bow.

DE 103 43 128 A1 discloses a convertible top comprising a tensioning bow which is configured as a floating bow. The tensioning bow is able to be displaced between a lowered position when the convertible top is open and a raised position when the convertible top is closed, the convertible top fabric being tensioned by the tensioning bow when the convertible top is closed. The raised position of the tensioning bow and thus the tensioning of the convertible top fabric may be adjusted by means of an adjusting device. It is noteworthy that the tensioning bow is arranged both in the lowered position and in the raised position below a portion of the vehicle body, and is covered thereby. For installing the tensioning bow in the vehicle body, therefore, a relatively large installation space is necessary in order to guide the tensioning bow into its position below the bodywork portion.

SUMMARY OF THE INVENTION

It is an object of the invention to provide a tensioning bow which allows a simplified installation of a convertible top in a motor vehicle body.

It is a further object of the invention to provide a convertible top which is configured for a simplified installation in a motor vehicle body.

It is a further object of the invention to provide a convertible vehicle allowing a simplified assembly.

It is a still further object of the invention to provide an improved method for mounting a convertible top on a motor vehicle body.

According to a first aspect of the invention, it is provided a tensioning bow comprising a main segment having a first end and a second end, a first pivotable segment being assigned to the first end of the main segment, and a second segment, wherein a first rotary joint pivotably connects the first pivotable segment to a portion of the main segment, and wherein a second rotary joint pivotably connects the first pivotable segment to the second segment. Advantageously, the tensioning bow as a whole may be reduced in size in at least one of its directions of extension. The first pivotable segment is assigned to a portion of the main segment which is preferably directly configured as part of the main segment and integrally configured therewith. Alternatively, the portion may be a separate part which is fixedly connected to the main segment. In a preferred design of the tensioning bow, in which the main segment is of substantially U-shaped configuration and encloses a rear region of the convertible top, a shortening of the tensioning bow may be achieved in the region of the first end of the main segment by a pivoting of the first segment relative to the main segment and to the second segment. Advantageously, therefore, a tensioning bow thus configured may be in the shortened position be provided for installation in a motor vehicle body, the length corresponding to the operating position of the tensioning bow being able to be achieved after inserting the tensioning bow into an opening of the motor vehicle body by a simple pivoting of the first segment. The second segment is preferably able to be fixedly connected to further parts of a convertible top. In particular, the second segment may be fixedly connected to a lateral main bearing of a convertible top, or integrally configured therewith. As an alternative, it may be provided that the second segment is able to be pivotably connected to further parts of the convertible top, whereby a greater flexibility is achieved during assembly of the tensioning bow.

Preferably, a third pivotable segment and a fourth segment are assigned to the second end of the main segment, expediently a third rotary joint pivotably connecting the third pivotable segment to a region associated with the main segment. Expediently, a fourth rotary joint connects the third pivotable segment to the fourth segment. In this embodiment, in which preferably the segments adjacent to the first end and the second end of the main segment are respectively configured and arranged as a mirror image of one another, a shortening of the tensioning bow at both ends of the main segment is advantageously possible. This further simplifies installation of the tensioning bow in the body of a convertible vehicle.

Expediently, a first rotational axis of the first rotary joint and a second rotational axis of the second rotary joint are aligned parallel to one another, preferably both rotational axes being aligned perpendicular to an extension plane of the tensioning bow. As a result, a pivoting movement of the first segment is guided in the extension plane of the tensioning bow. Preferably, rotational axes of the third rotary joint and of the fourth rotary joint are aligned parallel to one another, particularly preferably the rotational axes of all four rotary joints being aligned parallel to one another.

Preferably, a first spring element is assigned to the first rotary joint which pretensions the first rotary joint in a pivoting direction of the first segment. Particularly preferably, in this case, the first segment is pretensioned in a pivoting direction which corresponds to the pivoting movement of the first segment, proceeding from an assembly position into an operating position. Thus, a pivoting of the first segment is assisted during assembly of the tensioning bow. In particular when the first spring element has a relatively high spring force, a pivoting back of the first segment from the operating position into the assembly position is also effectively prevented without further securing means against the pivoting of the first segment having to be provided.

Preferably, a second spring element is assigned to the second rotary joint, which pretensions the second rotary joint in a rotational direction. Expediently, a pretensioned rotational direction of the first rotary joint and of the second rotary joint oppose one another whereby, during a pivoting of the first segment into the respective rotational direction, a shortening and/or lengthening of the distance between the second segment and the main segment of the tensioning bow is achieved.

It has to be understood that a corresponding spring element is preferably also associated with the third rotary joint and the fourth rotary joint, which spring element pretensions the rotary joints respectively in a pivoting direction of the third segment.

Particularly preferably, the spring elements in the pretensioned position have a particularly high torque, preferably up to 2.5 newton-meters. As a result it is advantageously ensured that it is not possible to pivot the tensioning bow back from the operating position into the assembly position without using considerable force. An additional securing of the rotary joints against inadvertent pivoting is thus not necessary but may be provided.

Preferably, the main segment comprises a first main segment half, a second main segment half and a central rotary joint, the first end of the main segment beeing assigned to the first main segment half and the second end of the main segment being assigned to the second main segment half, wherein the central rotary joint pivotable connects the first main segment half and the second main segment half. Advantageously, a shortening of the tensioning bow by a pivoting of the first segment and/or of the third segment relative to the second segment and/or the fourth segment may be achieved in this manner, in this case the first end and the second end of the main segment also being pivoted relative to one another, whilst the second segment and the fourth segment remain fixed. Thus a shortening of the tensioning bow is possible when the second segment and the fourth segment are fixedly connected to a main bearing of the convertible top.

According to a further aspect of the invention, it is provided a convertible top for a convertible vehicle comprising a tensioning bow which comprises a main segment having a first end and a second end, a first pivotable segment being assigned to the first end of the main segment, and a second segment, wherein a first rotary joint pivotably connects the first pivotable segment to a portion of the main segment, and wherein a second rotary joint pivotably connects the first segment to the second segment. Advantageously, the convertible top may be particularly easily mounted to a motor vehicle body, in an assembly position in which the first segment is pivoted relative to the main segment and relative to the second segment.

In a preferred embodiment of the convertible top, the tensioning bow is configured as a floating bow, which is inserted during the assembly process into a region which is covered by a part of the vehicle body. In this case, the possible shortening of the tensioning bow by a pivoting of the first segment is particularly useful.

Preferably, a third pivotable segment and a fourth segment are assigned to the second end of the main segment, expediently a third rotary joint pivotably connecting the third pivotable segment to a region associated with the main segment. Expediently, a fourth rotary joint connects the third pivotable segment to the fourth segment. In this embodiment, in which preferably the segments adjacent to the first end and the second end of the main segment are respectively configured and arranged as a mirror image of one another, a shortening of the tensioning bow at both ends of the main segment is advantageously possible. This further simplifies installation of the tensioning bow in the body of a convertible vehicle.

Expediently, the second pivotable segment may be pivotably connected to a main bearing of the convertible top. Preferably, in this case, the pivot axis of the pivotable connection when the convertible top is assembled is substantially horizontal so that the tensioning bow may be pivoted relative to the main bearing and the convertible top fabric may thus be tensioned.

According to a further aspect of the invention, it is provided a convertible vehicle, comprising a bodywork and a convertible top being displaceable between a closed position and an open position, wherein the convertible top comprises a tensioning bow having a main section and at least one pivotable section, wherein a first rotary joint pivotably connects the at least one pivotable section to a portion of the main section, the first rotary joint defining a first rotational axis, wherein the main section comprises a central rotary joint defining a central rotational axis, the first rotary joint being rotatable in a direction opposed to a rotational direction of the central rotary joint.

According to a further aspect of the invention, it is provided a method for mounting a convertible top to a body of a convertible motor vehicle, the convertible top comprising a tensioning bow having a main segment, a first pivotable segment and a second segment, the method comprising the steps of providing the convertible top in an assembly position, in which the first pivotable segment is pivoted relative to the second segment and to the main segment of the tensioning bow, inserting the tensioning bow into an opening of the motor vehicle body, and pivoting the first pivotable segment into an operating position, in which an extension of the tensioning bow in a longitudinal direction of the motor vehicle body is increased relative to the assembly position. Advantageously, this method makes it possible to mount a convertible top to the body of a convertible vehicle in a cost-effective and time-saving manner, without the tensioning bow having to be released from the further convertible top elements or again connected thereto. Expediently, the method is designed such that in the assembly position a third pivotable segment and a fourth segment of the tensioning bow are also pivoted relative to the main segment of the tensioning bow.

By assisting the pivoting of the pivotable segments by means of pretensioned spring elements, an assembly of the convertible top on the vehicle body is further simplified. At the same time, this provides the advantage that no further steps are required for securing the tensioning bow in the operating position, as a spring force applied by the spring elements is of sufficient size reliably to prevent an inadvertent pivoting of the pivotable segments.

Expediently, when pivoting the pivotable segments into the operating position, a first end and a second end of the main segment are displaced in a transverse direction of the motor vehicle body. As a result, it is also possible to insert the tensioning bow into bodywork openings, the width thereof transversely to the direction of travel of the vehicle being smaller than the extension of the tensioning bow in the operating position.

Expediently, the distance between the main bearings of the convertible top connected to the tensioning bow is kept constant during the assembly of the convertible top. As a result a simple assembly of the tensioning bow is ensured, in which further elements of the convertible top, in particular the further linkage parts connected to the main bearings, do not have to be released from the tensioning bow.

Further advantages and features of the invention are revealed from the following description of a preferred embodiment of the invention and from the dependent claims.

BRIEF DESCRIPTION OF THE DRAWINGS

Hereinafter, the invention is described in more detail by referring to the accompanying figures with reference to a first embodiment.

DETAILED DESCRIPTION

FIGS. 6 to 9 show a convertible vehicle 100 comprising a convertible top 101 and a body 102. The convertible top 101 comprises a front hoop 103, four intermediate hoops 104, a tensioning bow 1 and a top fabric 105 (as indicated by a dashed line in FIG. 6).

Now referring to FIGS. 1 to 5, the tensioning bow 1 comprises a main segment 2 which is of substantially U-shaped configuration, wherein, in an assembled state of the tensioning bow 1, the base side of the main segment 2 is arranged below a rear window 106 of the convertible vehicle 100 and the two arms respectively are arranged on lateral surfaces of the vehicle body 102 and face in the direction of travel of the vehicle 100. The main segment 2 is configured in two parts and comprises a first main segment half 3 and a second main segment half 4. The main segment halves 3, 4 are respectively formed from a metal core 5, which is encased by a plastics covering 6. The convertible top fabric (105) is fastened to the plastics covering 6, so that the convertible top fabric 105 may be tensioned by the tensioning bow 1. The first tensioning bow half 3 and the second tensioning bow half 4 are pivotably connected to one another in a central region of the tensioning bow 1 by means of a central rotary joint 7. The central rotary joint 7 is in this case configured such that, proceeding from the operating position of the tensioning bow 1 shown in FIG. 1 and FIG. 2, the main segment halves 3, 4 may be pivoted toward one another.

Figure 1:
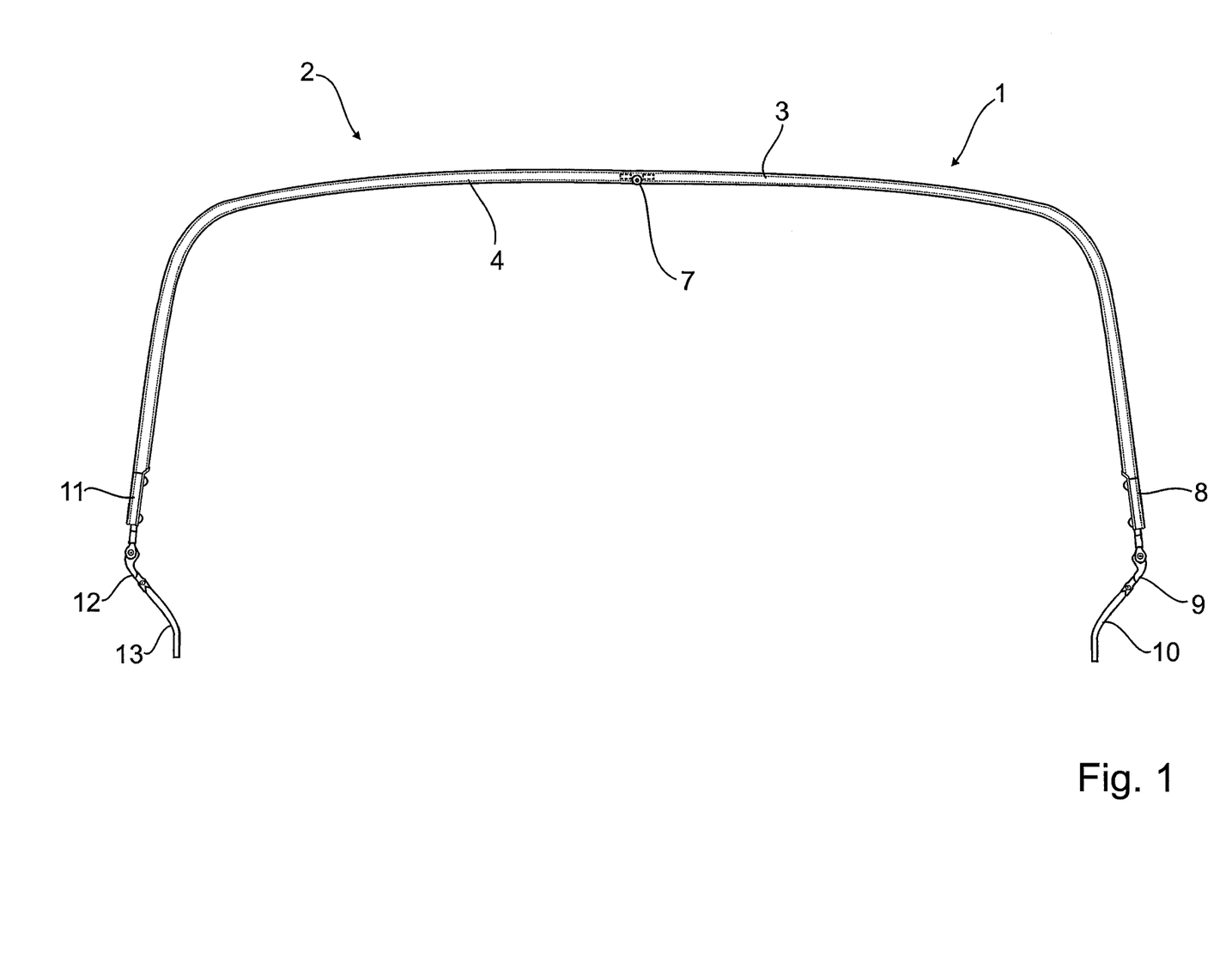
FIG. 1 shows a first embodiment of a tensioning bow according to the invention in the operating position in a cross-sectional view.
Figure 2:
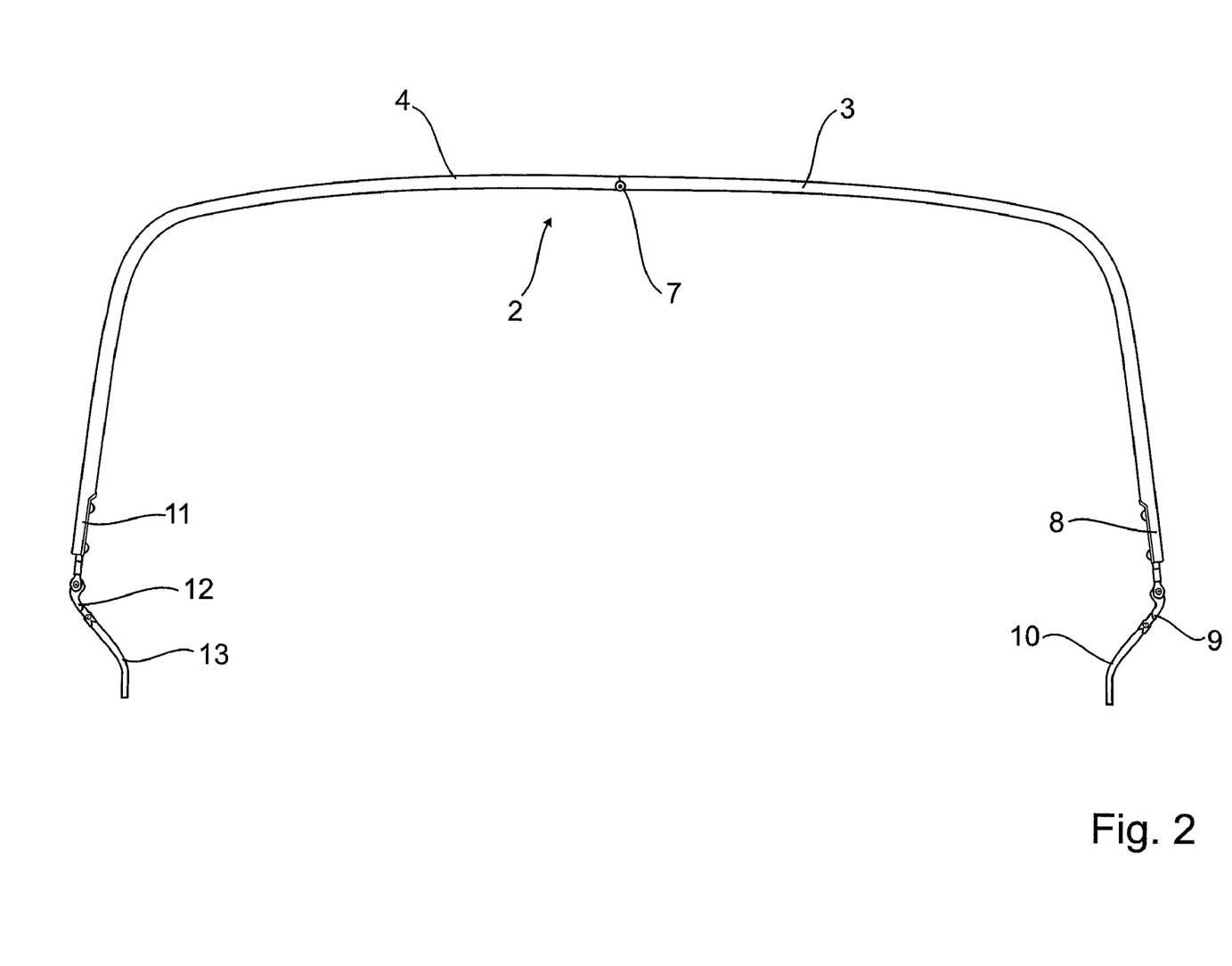
FIG. 2 shows the tensioning bow of FIG. 1 in a plan view from above.
Figure 3:
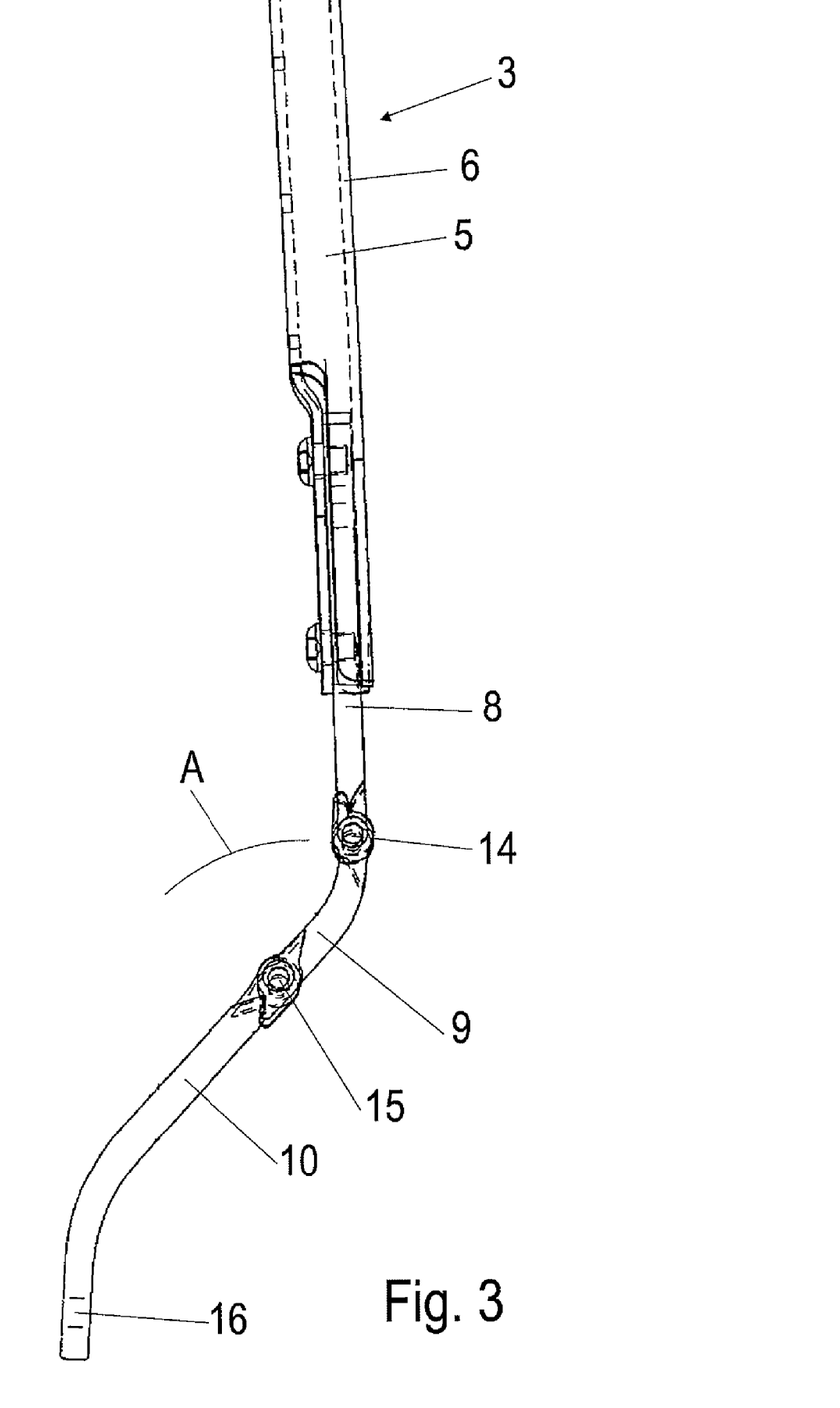
FIG. 3 shows a first end of the tensioning bow of FIG. 1 enlarged in a cross-sectional view.

The main segment 2 has a first end 8 and a second end 11 which are configured as a mirror image to one another. A first pivotable segment 9 and a second segment 10 are attached to the first end 8 of the main segment 2 as is explained in more detail below. Similarly a third pivotable segment 12 and a fourth segment 13 are attached to the second end 11. As the first end 8 is constructed with the first segment 9 and the second segment 10 as a mirror image to the second end 11 with the third segment 12 and the fourth segment 13, only the region of the first end 8 of the main segment 2 is explained in more detail below.

The first segment 9 is of curved configuration and is pivotably connected at a first end via a first rotary joint 14 to the first end 8 of the main segment 2. As may be seen in particular in FIG. 1 and FIG. 2, proceeding from the first end 8 of the main segment 2, the first segment 9 is curved toward the vehicle interior. The first segment 9 is at its second end pivotably connected to the second segment 10 via a second rotary joint 15. Proceeding from the second rotary joint 15, the second segment 10 has an opposing curvature in comparison with the first segment 9, so that the end of the second segment 10 remote from the second rotary joint 15, in the operating position of the tensioning bow 1 shown in FIG. 1 and FIG. 2, extends approximately parallel to the first end 8 of the main segment 2. The second segment 10 has at its end remote from the second rotary joint 15 a fastening opening 16. A main bearing 30 has a fastening opening corresponding to the fastening opening 16 of the second segment 10, the second segment 10 being able to be rotatably connected to the main bearing 30 of the convertible top by means of a bearing pin 32 penetrating the fastening opening 16 of the second segment 10 and the fastening opening of the main bearing 30. The rotational axis of the second segment 10 about the main bearing 30, said axis being defined by the bearing pin 32, faces, in the final assembly position of the tensioning bow 1, approximately horizontally in a direction perpendicular to the direction of travel of the convertible vehicle. By rotating the second segment 10 about the rotational axis defined by the bearing pin 32, a pivoting of the tensioning bow 1 as a whole is achieved whereby a tensioning of the convertible top fabric of the convertible top may be increased or reduced.

Figure 4:
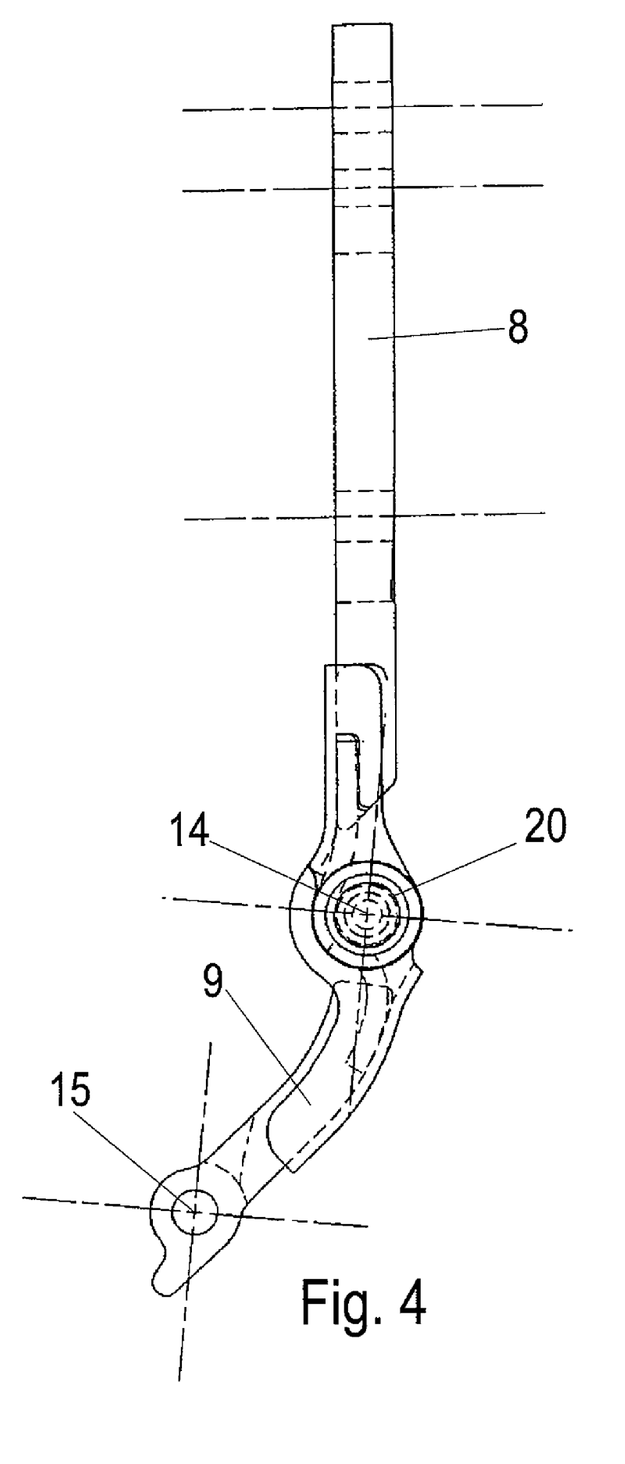
FIG. 4 shows the first end of the tensioning bow of FIG. 3 in a plan view from above.
Figure 4A:
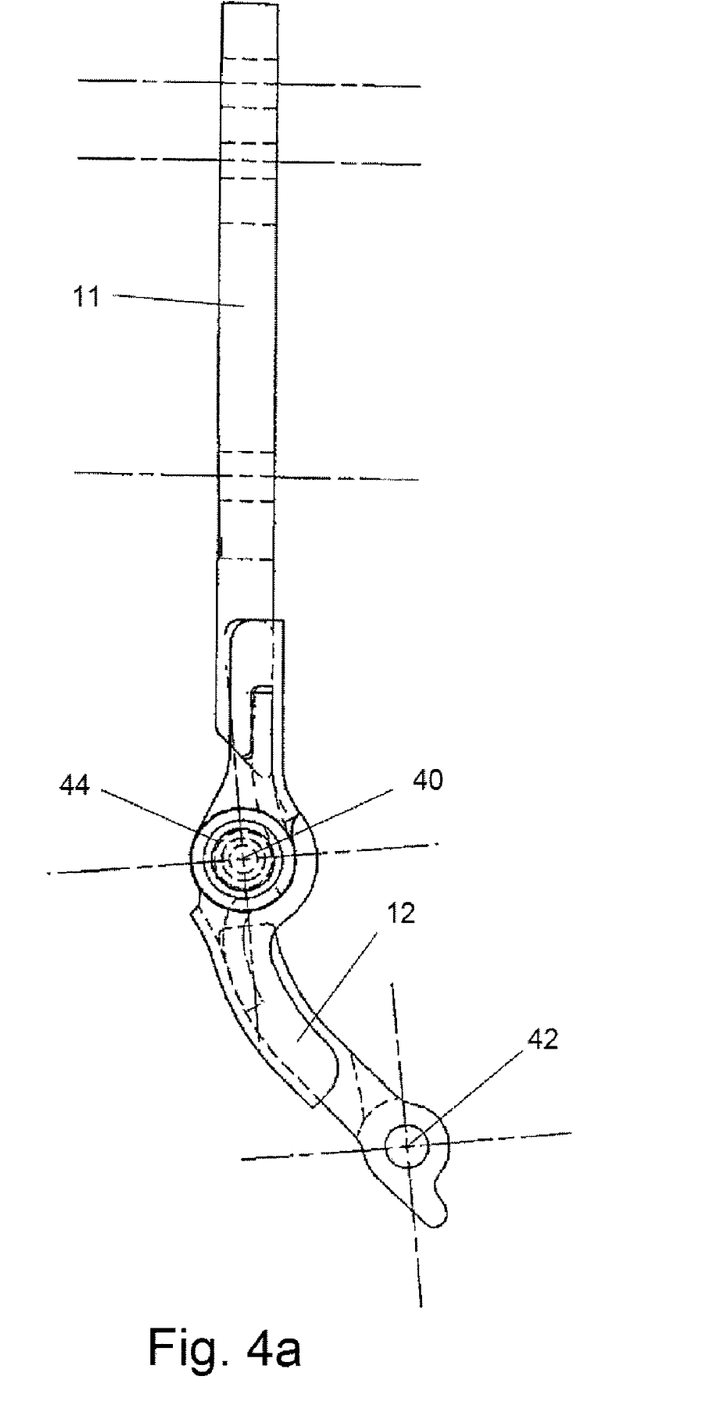
FIG. 4*a* shows a second end of the tensioning bow of FIG. 1 enlarged in a plan view from above.

FIG. 4a shows the second end 11 of the main segment 2. The third segment 12 is of curved configuration and is pivotably connected at a first end via a third rotary joint 40 to the second end of the main segment 2. The third segment 12 is at its second end pivotably connected to the fourth segment 13 via a fourth rotary joint 42. A second spring element 44, which in the present case is configured as a leg spring, encompasses the rotary joint 40 and pretensions the third segment 12 in the direction of the operating position.

Figure 5:
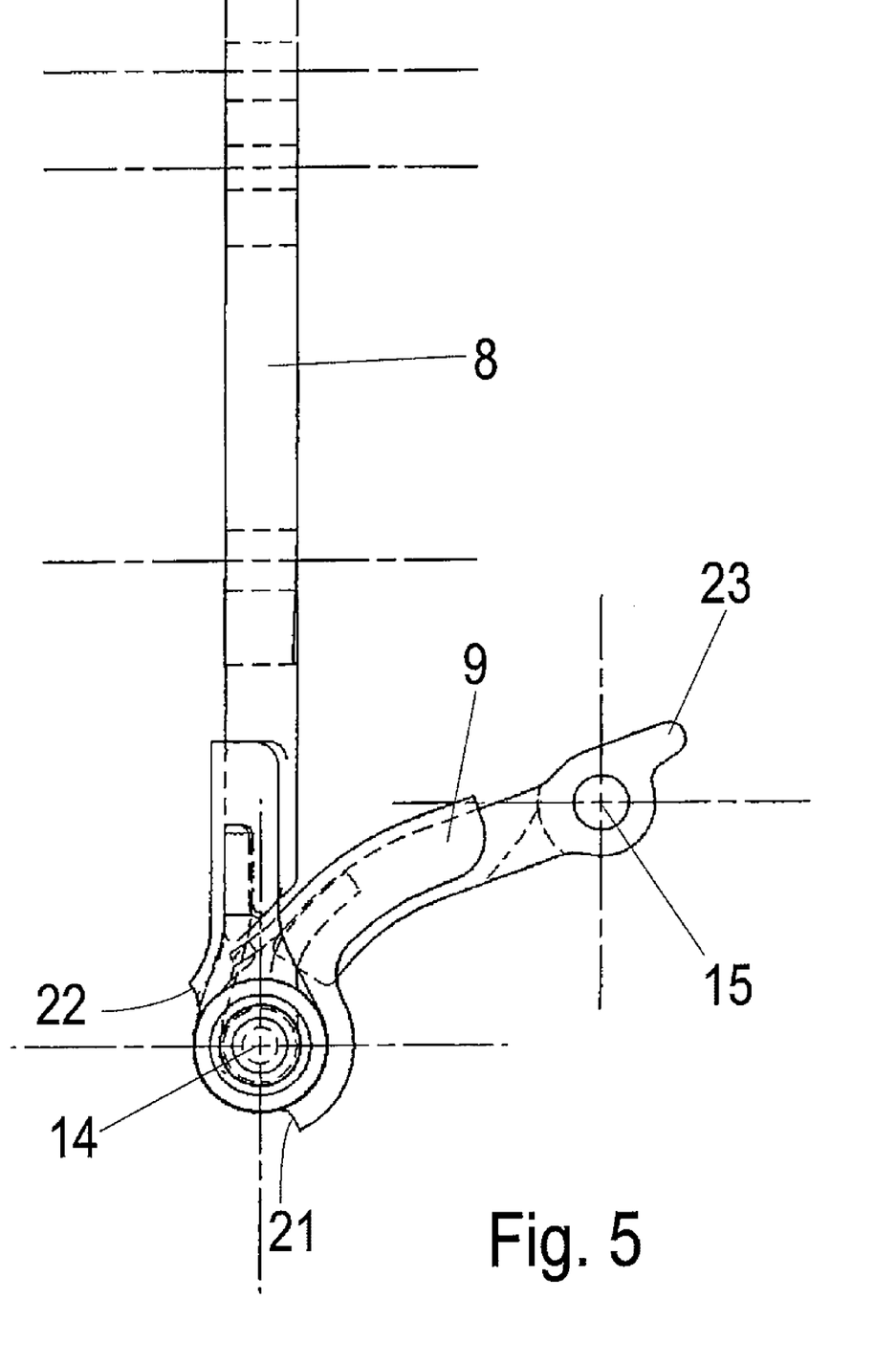
FIG. 5 shows the first end of FIG. 4 in the assembly position.
Figure 6:
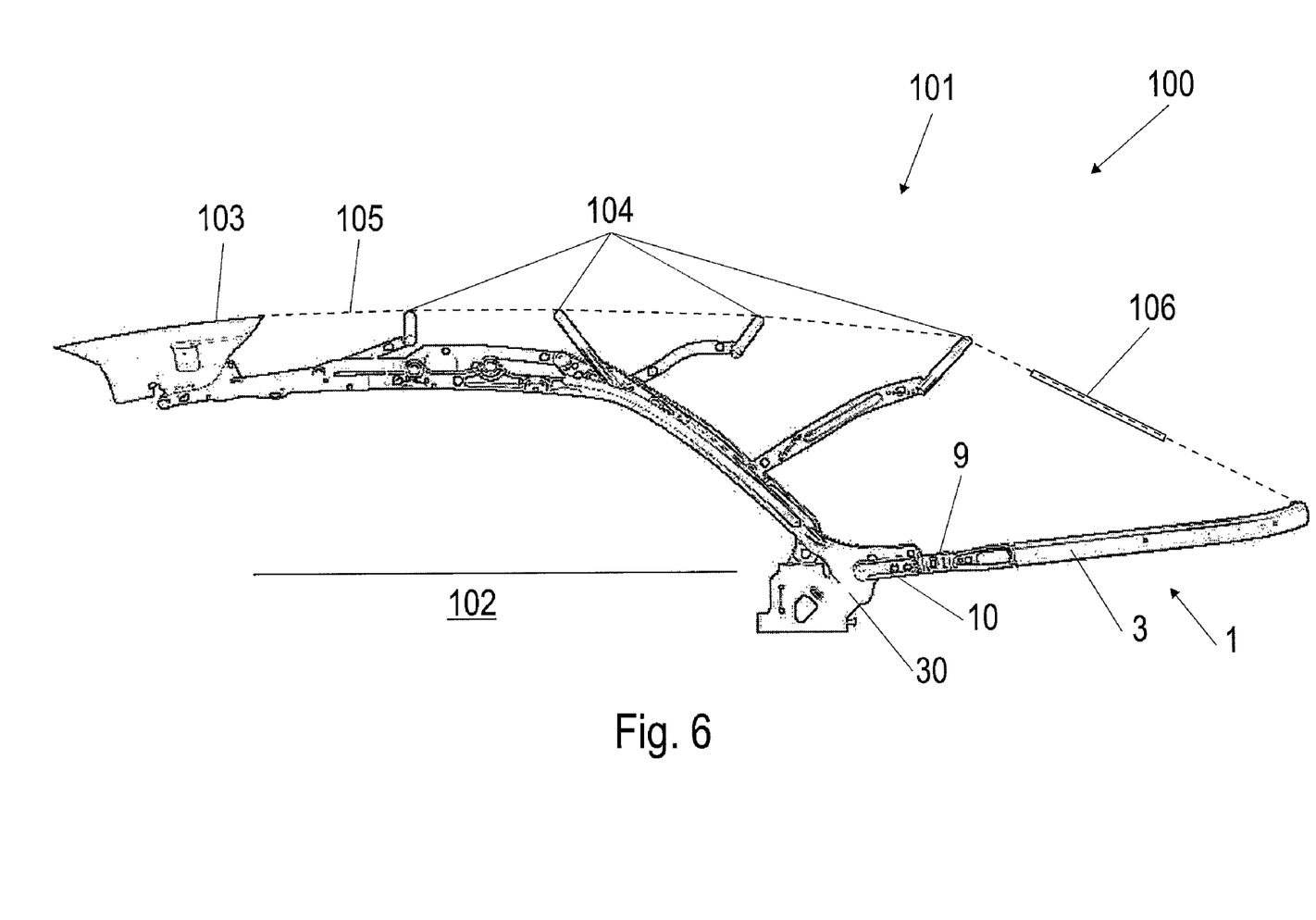
FIG. 6 shows a side elevation of a convertible vehicle with a convertible top comprising the tensioning bow of FIG. 1.
Figure 7:
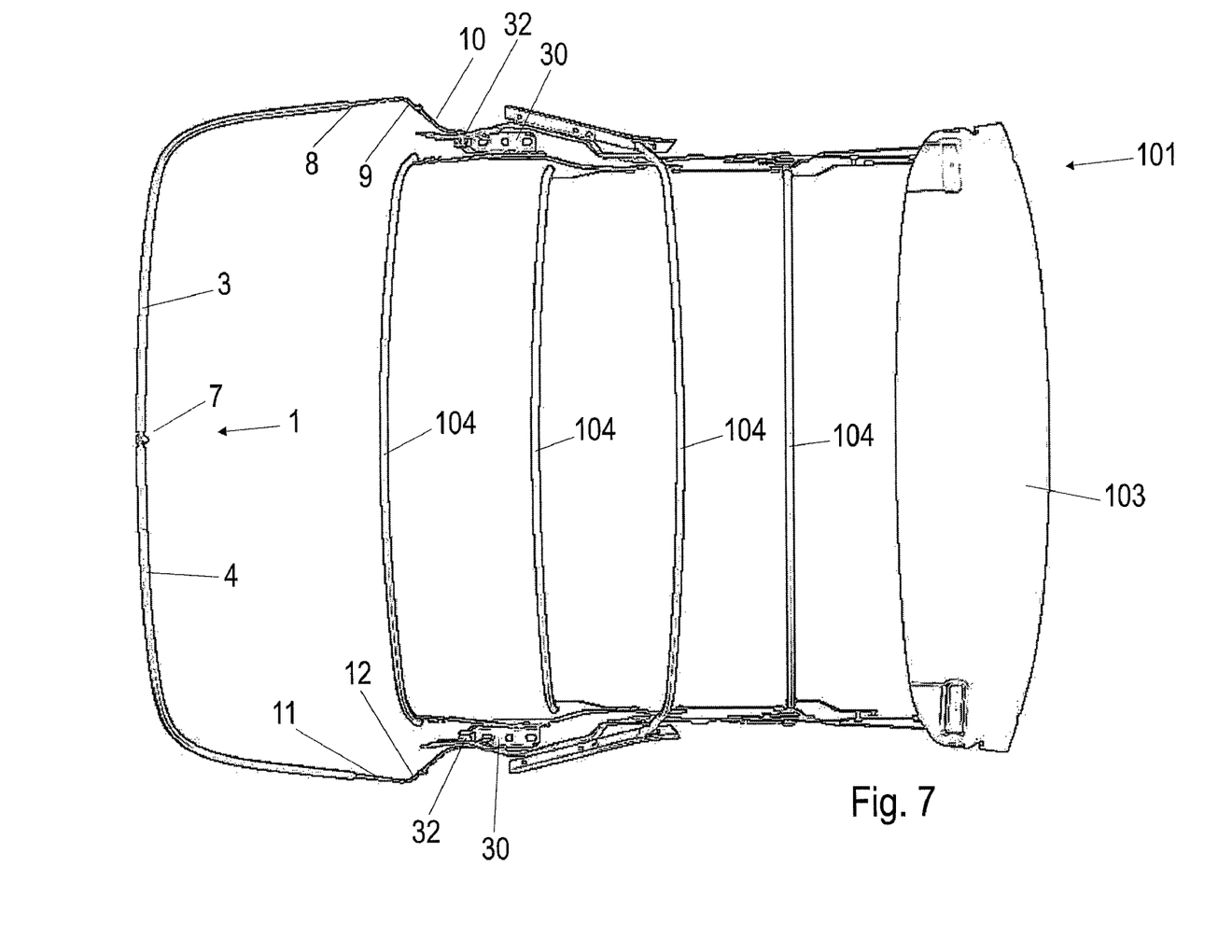
FIG. 7 shows a top elevation of the convertible top of FIG. 6.
Figure 8:
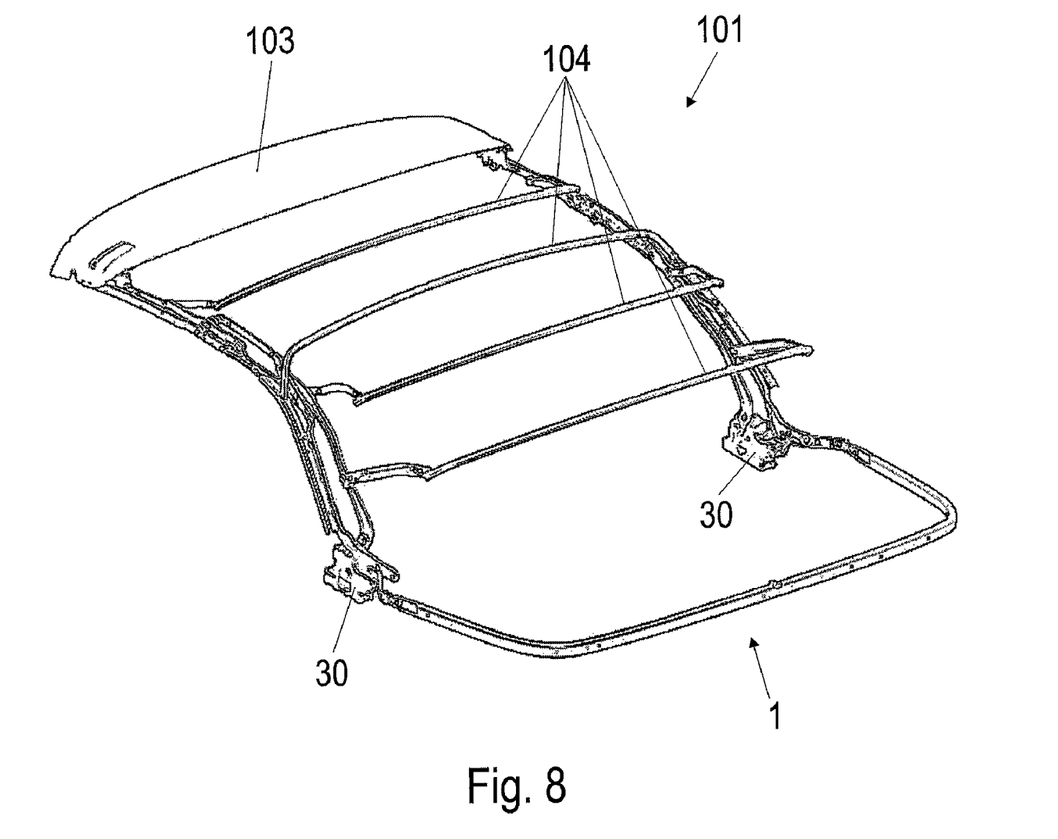
FIG. 8 shows a first perspective view of the convertible top of FIG. 6.
Figure 9:
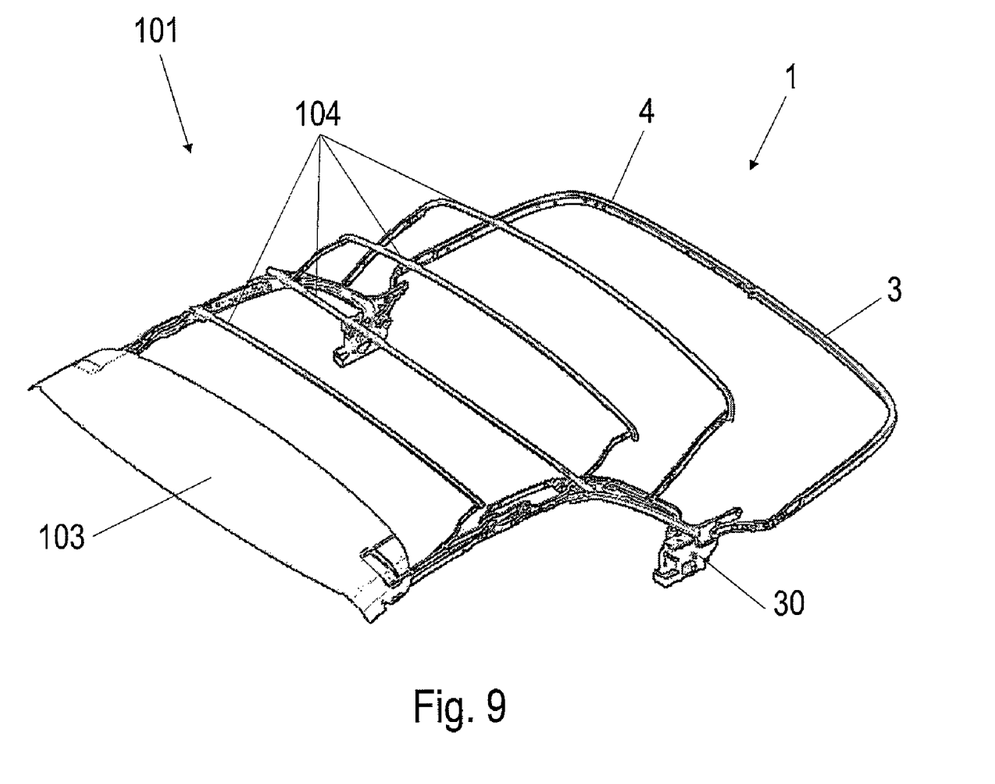
FIG. 9 shows a second perspective view of the convertible top of FIG. 6.

In FIG. 5 the first segment 9 and an end portion 16 of the main segment 2 are shown in the assembly position. As is visible, the first segment 9 is pivoted by approximately 150 degrees in comparison with the operating position shown in FIG. 4. A pivoting of the first segment 9 takes place along the arrow A (see FIG. 3). A first spring element 20, which in the present case is configured as a leg spring, encompasses the rotary joint 14 and pretensions the first segment 9 in direction of the operating position. As may be seen in particular in FIG. 5, the first segment 9 in the vicinity of the first rotary joint 14 has a stop region 21 which in the operating position cooperates with a corresponding stop region 22 of the first end 8 of the main segment 2 and forms an end stop for the first segment 9. In a similar manner, the first segment 9 has in the vicinity of the second rotary joint 15 a stop region 23 which in the present case is configured as a projection and cooperates with a corresponding stop region of the second segment 10.

The operation of the inventions is as follows:

The tensioning bow 1 for assembling the convertible top is initially provided in the assembly position in which the second segment 10 and the fourth segment 13 are respectively fixedly connected to main bearing units 30 of the convertible top 101 and in which the first segment 9 and the third segment 12 are respectively pivoted by an angle of approximately 150 degrees toward the vehicle interior. In this position, the first end 8 and the second end 11 of the main segment 2 of the tensioning bow 1 are also pivoted toward one another about the central rotary joint 7. In the assembly position, an extension of the tensioning bow 1 both in the direction of travel and also transversely to the direction of travel are shortened in comparison with the operating position. For assembling the convertible top 101 on the vehicle body 102, the tensioning bow 1 is inserted in the assembly position into an opening of the vehicle body 102 provided for the convertible top 101. Subsequently, the first segment 9 and the third segment 12 are pivoted into the operating position, the first end region 8 and the second end region 11 of the main segment 2 being moved away from one another in the transverse direction of the vehicle. It is advantageous in this case that the second segment 10 fastened to the first main bearing 30 and the fourth segment 13 fastened to the second main bearing 30 are not displaced in their relative positions, so that the tensioning bow 1 as a whole may remain assembled on the main bearings 30 during the entire assembly process.

What is claimed is:

1. A tensioning bow for a convertible top, comprising
a main segment having a first end and a second end,
a first pivotable segment being assigned to the first end of the main segment, and
a second segment,
wherein a first rotary joint pivotably connects the first pivotable segment to a portion of the main segment,
wherein a second rotary joint pivotably connects the first pivotable segment to the second segment, and
wherein an end of the second segment opposite the second rotary joint is pivotable about an axis running perpendicular to an axis of the second rotary joint.

2. The tensioning bow as claimed in claim 1, further comprising a third pivotable segment and a fourth segment, the third pivotable segment and the fourth segment being assigned to the second end of the main segment.

3. The tensioning bow as claimed in claim 2, wherein a third rotary joint pivotably connects the third pivotable segment to a portion of the main segment.

4. The tensioning bow as claimed in claim 3, wherein a fourth rotary joint pivotably connects the third pivotable segment to the fourth segment.

5. The tensioning bow as claimed in claim 1, wherein the first rotary joint has a first rotational axis and the second rotary joint has a second rotational axis, the first rotational axis and the second rotational axis being parallel to one another.

6. The tensioning bow as claimed in claim 1, further comprising a first spring element pretensioning the first rotary joint in a first pretensioned pivoting direction of the first pivotable segment.

7. The tensioning bow as claimed in claim 6, further comprising a second spring element pretensioning the second rotary joint in a second pretensioned pivoting direction.

8. The tensioning bow as claimed in claim 7, wherein the first pretensioned pivoting direction of the first rotary joint and the second pretensioned pivoting direction of the second rotary joint oppose one another.

9. The tensioning bow as claimed in claim 1, wherein the main segment comprises a first main segment half, a second main segment half and a central rotary joint, the first end of the main segment being assigned to the first main segment half and the second end of the main segment being assigned to the second main segment half, wherein the central rotary joint pivotable connects the first main segment half to the second main segment half.

10. The tensioning bow as claimed in claim 6 wherein the first spring element pretensions the first rotary joint so as to hold the first rotary joint away from the second rotary joint.

11. The tensioning bow as claimed in claim 10 wherein pivoting the first end of the main section towards the second end of the main segment to overcome the pretensioning of the spring causes the first pivotable section to pivot about the first and second rotary joints.

12. A convertible top for a convertible vehicle, comprising
a tensioning bow comprising a main segment having a first end, a second end and a central rotary joint between the first and second ends,
a first pivotable segment being assigned to the first end of the main segment, and
a second segment,
wherein a first rotary joint pivotably connects the first pivotable segment to a portion of the main segment,
wherein a second rotary joint pivotably connects the first pivotable segment to the second segment; and
wherein the tensioning bow is configured such that pivoting the first pivotable segment about the second rotary joint from an untensioned position causes the first rotary joint to move away from the second end of the main segment and causes the first and second end of the main segment to pivot away from each other into a tensioned position.

13. The convertible top as claimed in claim 12, further comprising a third pivotable segment and a fourth segment, the third pivotable segment and the fourth segment being assigned to the second end of the main segment, wherein a third rotary joint pivotably connects the third pivotable segment to a portion of the main segment, and wherein a fourth rotary joint pivotably connects the third pivotable segment to the fourth segment.

14. The convertible top as claimed in claim 12, wherein the tensioning bow is configured as a floating bow.

15. The convertible top as claimed in claim 12, wherein the second pivotable segment is connectable in a pivotable manner to a main bearing of the convertible top.

16. The convertible top as claimed in claim 12 wherein the tensioning bow is configured such that pivoting the first pivotable segment about the second rotary joint from a tensioned position causes the first rotary joint to move towards the second end of the main segment and causes the first and second ends of the main segment to pivot towards each other.

17. The convertible top as claimed in claim 12 wherein the main segment is of substantially U-shaped configuration.

18. A convertible vehicle, comprising
a bodywork, and
a convertible top being displaceable between a closed position and an open position,
wherein the convertible top comprises a tensioning bow having a main section and at least one pivotable section,
wherein a first rotary joint pivotably connects the at least one pivotable section to a portion of the main section, the first rotary joint defining a first rotational axis,
wherein the main section comprises a central rotary joint defining a central rotational axis, the first rotary joint being rotatable in a direction opposed to a rotational direction of the central rotary joint,
wherein the at least one pivotable section is fixed to the bodywork such that the tensioning bow is positioned in an opening in the bodywork.

19. The convertible vehicle as claimed in claim 18 further comprising a rear window, the tensioning bow being positioned below the rear window.

20. The convertible vehicle as claimed in claim 18 wherein the tensioning bow is configured such that it is insertable into the opening in an assembly position and extendable into an operating position, a width of the tensioning bow in the operating position being wider than a width of the opening.

* * * * *